Figure 11A:
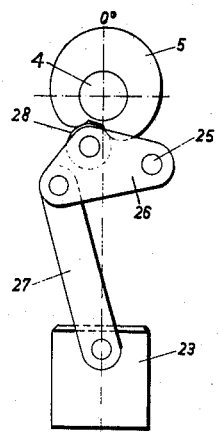
Figure 11B:
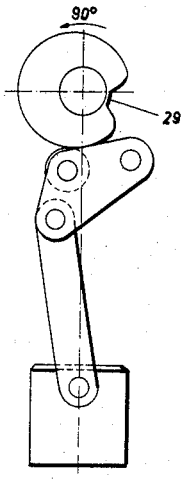
Figure 11C:
Figure 11D:
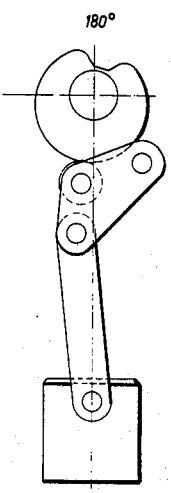

Oct. 12, 1965  W. VOESTER ETAL  3,210,796
DOOR CLOSER
Filed Sept. 6, 1960  6 Sheets-Sheet 1
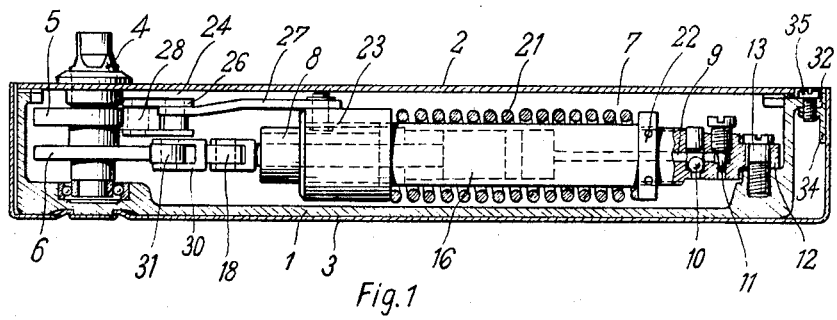
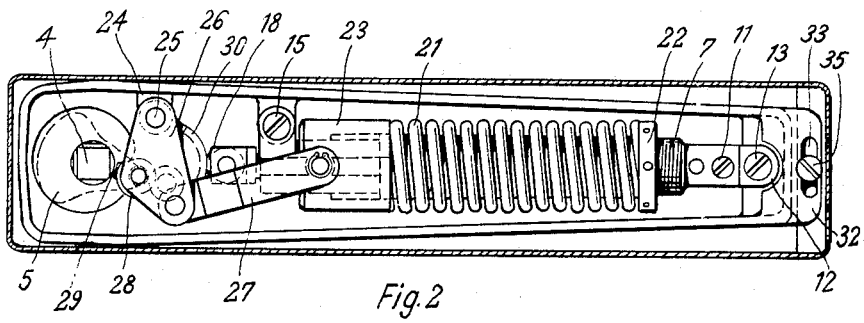
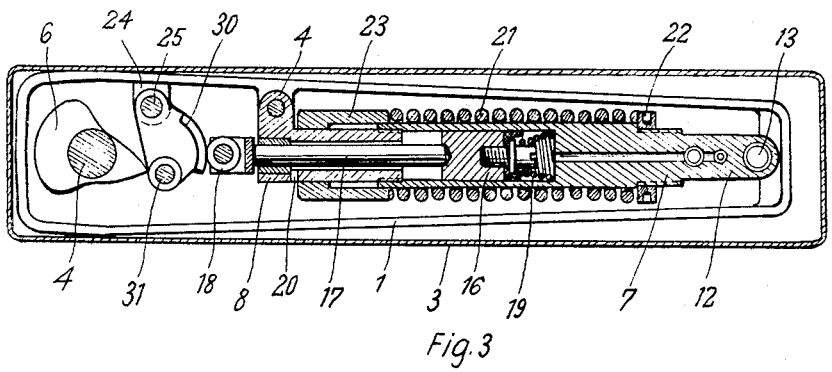
INVENTOR
Walter Voester
Wolfgang Schmid
BY
Michael S. Striker
ATTORNEY Oct. 12, 1965   W. VOESTER ETAL   3,210,796
DOOR CLOSER Filed Sept. 6, 1960   6 Sheets-Sheet 2

INVENTORS
Walter Voester
Wolfgang Schmid
BY Michael S. Striker
ATTORNEY

Oct. 12, 1965

W. VOESTER ETAL 3,210,796

DOOR CLOSER

Filed Sept. 6, 1960

6 Sheets-Sheet 3

INVENTORS

BY

ATTORNEY

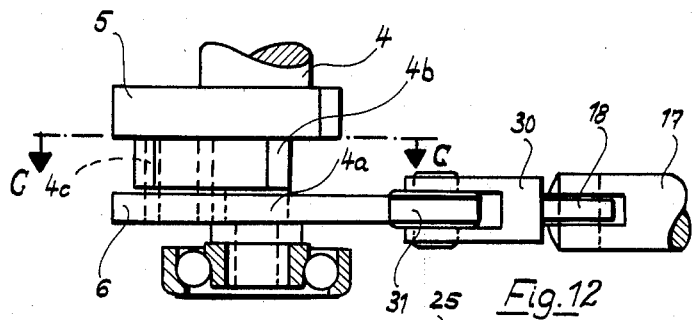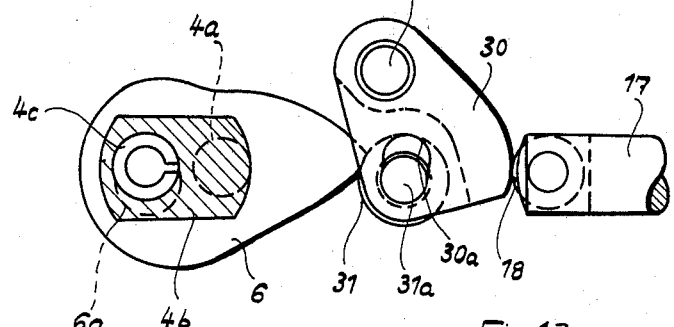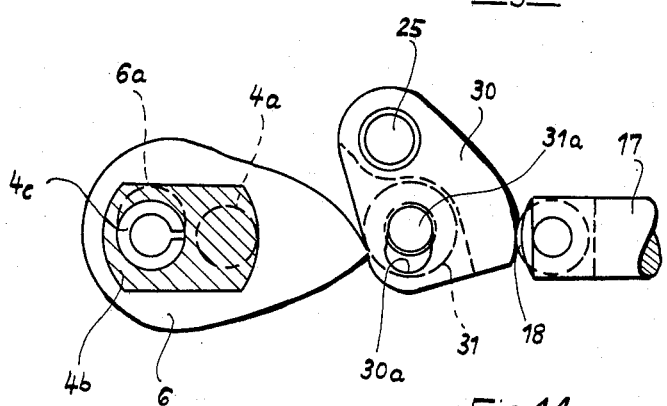

United States Patent Office
3,210,796
Patented Oct. 12, 1965

3,210,796
DOOR CLOSER
Walter Voester, 29 Im Falkenrain, and Wolfgang Schmid,
100 Steiermarker Strasse, both of Stuttgart, Germany
Filed Sept. 6, 1960, Ser. No. 54,124
Claims priority, application Germany, Sept. 5, 1959,
V 17,197; Oct. 16, 1959, V 17,412
15 Claims. (Cl. 16—55)

This invention relates to a door closer, especially for swinging doors, of the kind comprising a closer spindle extending out of the housing and rotatable in both directions, a helical closer spring acting upon the closer spindle through a rocking lever mounted in the housing and provided with a roller and through a cam disc mounted on the closer spindle, and a damping arrangement which lies within the helical closer spring and the piston of which also acts through a cam disc upon the closer spindle.

The invention is based upon the problem of providing a closer of the kind referred to, wherein the movement of the piston of the damping arrangement is independent of the movement of the closer spring, and the damping arrangement, in the opening of the door, after a specific angle of opening, damps the further movement of the swinging door. This problem is solved according to the invention in that the end of the closer spring facing the closer spindle is operatively connected through a guide rod with the rocking lever, the latter being constructed as a single-armed lever, the closer spring and the damping arrangement each having their own cam disc, the cams of which are differently shaped, and the piston of the damping arrangement can be pressed by a spring against the appertaining cam disc.

The door according to the present invention is provided in advantageous manner with an opening brake, which prevents the door, during opening, even when the door is relatively heavy, from swinging with the momentum imparted to it beyond the desired angle of opening and striking against an adjoining wall.

In a preferred form of embodiment the piston of the damping arrangement can act through a second rocking lever upon the cam disc, due to the fact that the piston rod engages with a presser roller on the rocking lever and the latter also engages with a presser roller upon the cam disc. Here the two rocking levers can expediently be pivotable about a common spindle.

A further advantage of the invention resides in the compactness of the closer. Its housing can possess in plan view the form of a narrow, elongated trapezium, which tapers towards the side remote from the closer spindle, and the installation of the closer to a correct position can be made in a simple manner since the housing is adjustable about the closer spindle and securable in adjusted position in an installation box, rotating.

The efficiency of the closer is improved by arranging the movable closer parts thereof in such a manner so as to transmit the force from the closer spring onto the closer spindle with a minimum of friction.

The accompanying drawings illustrate the invention by way of example, in various forms of embodiment.

Figure 4:
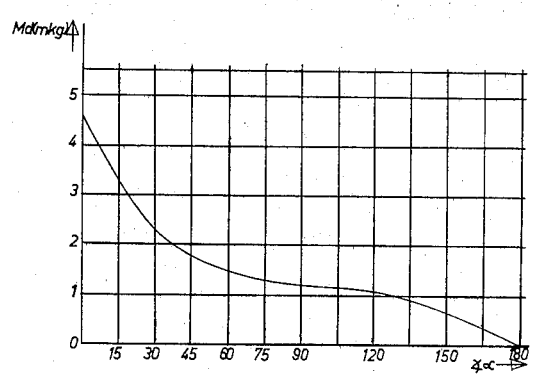
Figure 5:
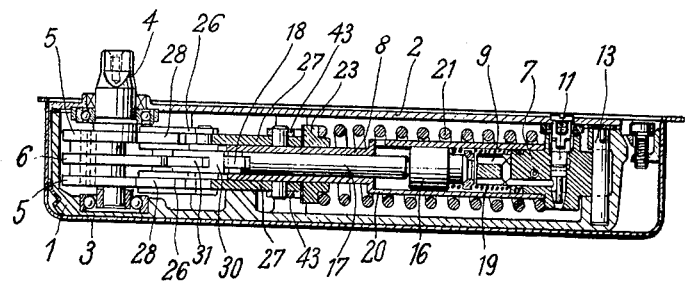
Figure 6:
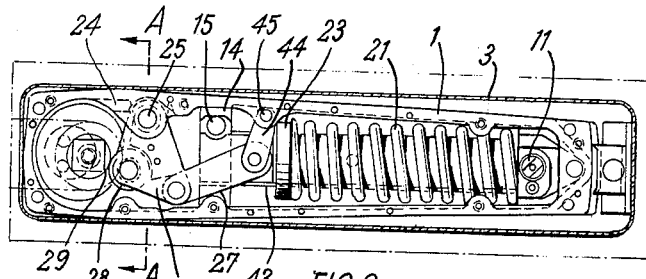
Figure 7:
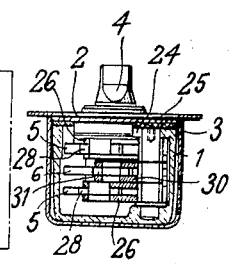
Figure 8:
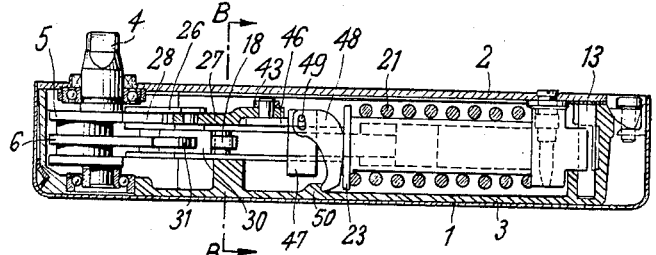
Figure 9:
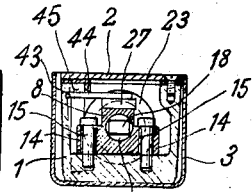
Figure 10:
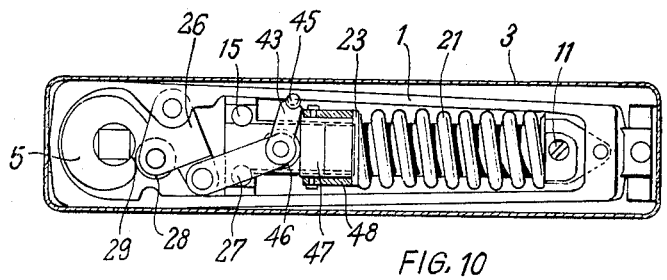
Figure 15:
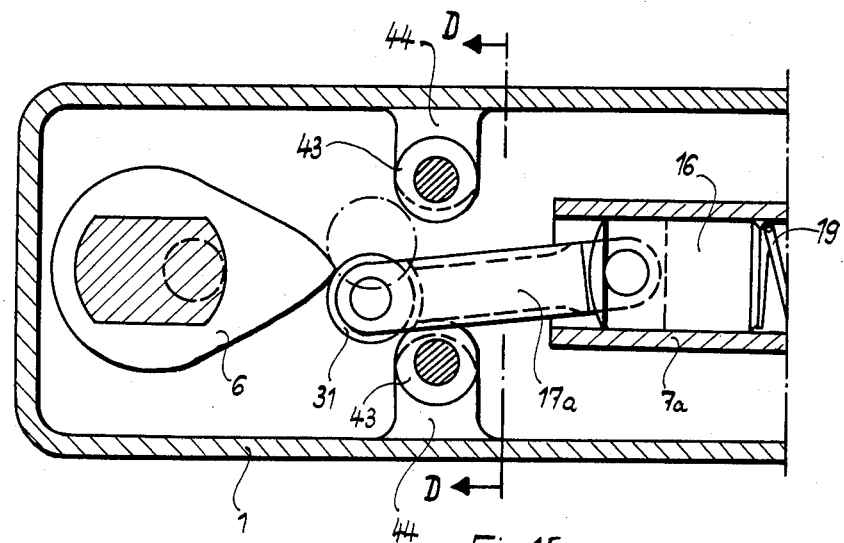
Figure 16:
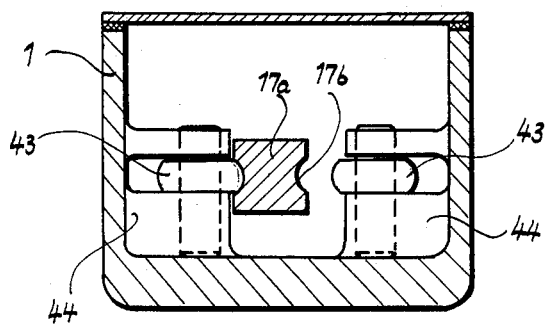
Figure 17:
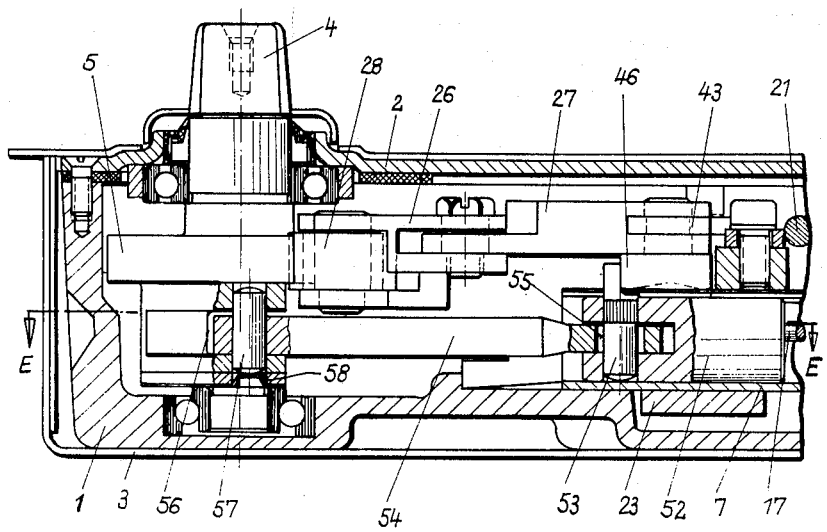
Figure 18:
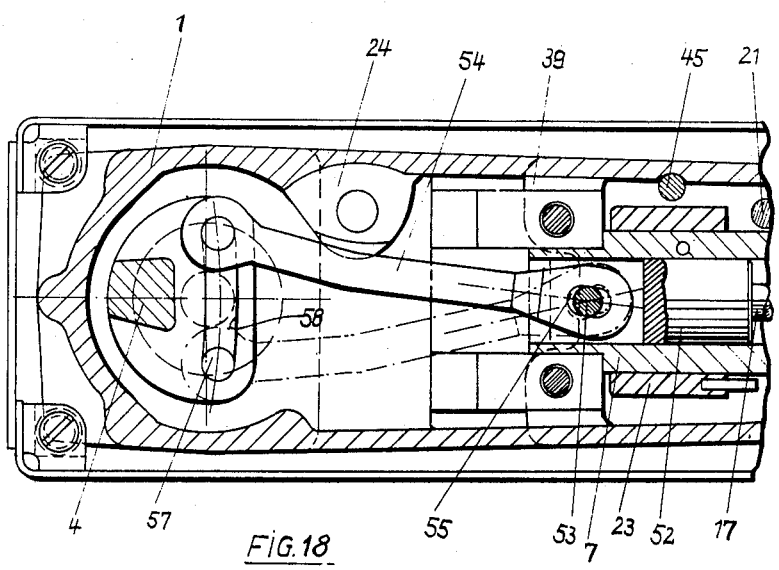

FIGURE 1 shows a door-closer constructed in accordance with the invention, in a longitudinal section,
FIGURE 2 shows a plan view of the opened closer in the zero position,
FIGURE 3 shows a horizontal section thereof, at the level of the axis of the damping arrangement,
FIGURE 4 shows a diagram of the torque acting on the closer spindle, in the embodiment shown in FIGURE 1,
FIGURE 5 shows a second form of door closer according to the invention in a longitudinal section,
FIGURE 6 shows a plan view of the opened closer in the zero position,
FIGURE 7 shows a cross-section thereof along A—A in FIGURE 6,
FIGURE 8 shows a third form of closer in accordance with the invention, with rocker, in a longitudinal section,
FIGURE 9 shows a cross-section thereof along B—B in FIGURE 8,
FIGURE 10 shows a plan view thereof, of the opened closer,
FIGURES 11a, 11b, 11c and 11d show the position of the door closer gearing of the first embodiment, in four different opening angles of the door,
FIGURE 12 shows the pressure-transmitting means between the damping arrangement and the closer spindle of a closer constructed in accordance with the invention, in a lateral elevation, with the door in the closed position after the closing movement in the clockwise direction,
FIGURE 13 shows a section thereof along C—C in FIGURE 12,
FIGURE 14 shows the same section in the closed position after a rotation of the door leaf in the counter-clockwise direction,
FIGURE 15 shows a form of embodiment of the closer without a rocking lever, in a plan view of the pressure-transmitting means,
FIGURE 16 shows a section thereof along D—D in FIGURE 15,
FIGURE 17 shows a form of closer in accordance with the invention, with damping of the closer spring force shortly before the closed position, in a longitudinal section in the longitudinal central plane, and
FIGURE 18 shows a cross-section thereof along E—E in FIGURE 17.

In the drawings, 1 designates a housing, which has in plan outline the form of a narrow, elongated trapezium, and is closed in fluid-tight fashion by a lid 2. This housing 1 is arranged in an installation box 3 of rectangular outline.

In the housing 1 is mounted a closer spindle 4, which projects with its lid end above the lid 2. In the embodiment of the closer according to the invention as shown in FIGURES 1 to 3, two cam discs 5 and 6 are arranged horizontally one below the other on the closer spindle. In one plane with the lower cam disc 6 there is secured in the housing a damper arrangement. This consists of an end piece 7 and a head piece 8. The end piece 7 defines a cylinder space and a liquid conduit 9, in which regulating valves 10 and 11 are arranged. For securing the end piece 7 a mounting eye 12 is provided on the rearward end thereof, and a headed screw 13 is passed through this eye and screwed into a threaded bore in the housing. The head piece 8 is provided on its end facing the end piece 7 with screw-threading and is screwed therewith into the opening of the cylinder space of the end piece 7. The head piece 8 also carries a mounting eye 14 and is secured by means of a headed screw 15 to a projecting part of the housing 1. In the cylinder space of the end part 7 there is movable a piston 16 with a piston rod 17, carrying a roller 18 on its end projecting beyond the head piece 8. The piston rod 17 is mounted loosely in a bore of the piston 16 and is guided rectilinearly in the head piece 8 in suitable manner, for example by a pin running in a groove (not shown in the drawing), in such a way that the roller 18 cannot rotate about the axis of the piston rod 17. A compression spring 19 is located between the bottom of the cylinder space and the piston 16. The cylinder space is in open communication with the internal space of the housing through a bore 20, preferably within the head piece 8. For this purpose the internal diameter of the central bore of the head piece 8 is made larger than the external diameter of the piston rod 17, which is guided in the bore at the end facing the closer spindle 4, in suitable fashion, for example by means of an inserted ring. The liquid conduit 9 of the end piece 7, controlled by the regulating valve 10 and 11, also opens into the internal space of the housing 1; this space, however, may be kept dry if within the damping arrangement there is provided a by-pass conduit for the damping liquid.

On the end piece 7 of the damping arrangement there is mounted a helical closer spring 21 which rests with its end remote from the closer spindle 4 on a shaft ring 22 screwable on the end piece 7. The other end of the spring 21 is supported on a spring plate 23, which is displaceable on the head piece 8. On a projecting part 24 of the housing 1 there is articulated a rocking lever 26 of approximately triangular outline, pivotable about a pivot pin 25. Its free end is hingedly connected with the spring plate 23 through a guide rod 27. On the side of the rocking lever 26 facing the closer spindle 4 there is arranged a roller 28, which rests against the cam disc 5. This disc has the form of an eccentric disc and is provided with a recess 29, in which the roller 28 engages in the zero position of the closer, that is to say when the door is closed. At the level of the cam disc 6, which consists of a heart-shaped part and a circular part, there is articulated on the projecting part 24 of the housing 1 with the pivot pin 25 a second rocking lever 30, which, on the one hand, engages with a roller 31 the cam disc 6 and, on the other hand, with a cylindrically shaped portion thereof the roller 18 of the piston 17 of the damping arrangement.

On the end of the housing 1 remote from the closer spindle 4 there is provided a flange 32, which is provided with an arcuate slot 33 and rests on a projecting part 34 of the installation box 3. A headed screw 35, the head of which lies in an opening of the lid 2, passes through the slot 33 of the flange 32 and is screwed into the projecting part 34 of the installation box 3. When the screw 35 is loosened, the housing 1 of the closer with the entire gearing can be angularly adjusted about the centre of the spindle 4 and set so that when the gearing is in the zero position the leaf of the door is closed. By tightening of the screw 35 the closer is then secured in its correct position within the installation box 3.

The manner of operation may readily be seen by reference to the drawings. On opening of the door the roller 28 of the rocking lever 26 rolls along the cam face of the cam disc 5. The guide rod 27 shifts the spring plate 23 against the spring force of the spring 21 and tensions the latter so that the tensioned spring will press the roller with increasing force against the cam face. Since the cam face is eccentric relative to the axis of the cam 5, the pressure force exerted by the roller on the cam face will pass in any turned position of the cam differing from the zero position a certain distance laterally spaced from the cam axis so as to exert a turning movement to the cam tending to return the latter to its zero position. In the first form of embodiment of the invention the guide rod 27 is compressively stressed. After the release of the door leaf the expanding spring 21 returns the cams into the closure position, in which the roller 28 of the rocking lever 26 engages in the recess 29 of the cam disc 5.

These operations are illustrated in FIGURE 7 of the drawing, in which the closer gearing is illustrated with the door closed, at an opening angle of the leaf of 90° in both directions of rotation, and at an opening angle of 180°.

The manner of operation of the damping arangement may be seen from FIGURE 3. Under the action of the spring 19 the roller 18 of the piston rod 17 engages the rocking lever 30 and the roller 31 thereof engages the cam disc 6. In the illustrated zero position the axis of the heart-shaped cam part coincides with the line of connection of the centres of the closer spindle 4 and of the roller 31. In opening of the door, as a result of the heart shape of the cam disc 6, the roller 31 approaches the closer spindle, and the piston 16 is moved by the spring 19 towards the head piece 8, the liquid being sucked through the valve 10 into the part of the cylinder space facing the end piece 7. At an opening angle of about 90° the roller 31 lies closest to the closer spindle 4 and on further rotation of the door departs again from the centre of the closer spindle 4, due to the fact that it now runs up on the circular part of the cam disc 6. The cam disc 6 is so designed, in the examples of embodiment as illustrated, that the roller 31 reaches its major distance from the centre of the closer spindle 4 at an opening angle of the leaf of about 120°. However it may also be so designed that the distance of the roller 31 from the centre of the closer spindle 4 increases up to an opening angle of the door of 180°. Due to this movement of the rocking lever 30 the piston 16 is pushed back into the cylinder space of the end piece 7 and must expel the liquid against the action of the interposed throttle valve 11. Due to this movement of the piston 16 the movement of the door is braked in a new and advantageous manner in the opening range between 90° and 120°. On closing of the door under the action of the expanding closer spring 21 the damping arrangement comes into action in the usual manner through the heart-shaped cam part of the cam disc 6.

FIGURE 4 of the drawing illustrates graphically the torques acting upon the closer spindle 4 during opening of the door in the first form of embodiment of the closer. It shows that the torque is very high in the case of a small opening angle, then drops away rapidly, remains approximately constant in the medium opening range, and finally drops away to zero at an opening angle of 180°.

The form of embodiment of the closer according to FIGURES 5 to 7 differs from that illustrated in FIGURES 1 and 2 in that in each case, above and below the rocking lever 30 there is articulated on the housing projecting part 24 a rocking lever 26 pivotable about the spindle 25.

On each rocking lever 26 there is arranged a guide rod 27, which is supported with its other end on a sliding surface of the spring plate 23. The ends of the two guide rods 27 are guided on the housing 1 due to the fact that they are connected articulatedly each with an additional rocking lever 43, which levers 43 in turn are articulated each to a projecting part 44 of the housing 1 by means of a pin 45.

While in the case of the closer as illustrated in FIGURES 5 to 7 the guide rods 27 rest directly on the spring plate 23, in the case of the embodiment as illustrated in FIGURES 8 and 12 they carry each on their support end a roller 46. The rocking lever 43 has on its end facing the housing only an arcuate recess, which which it rests on the hinge bolt 45. The other end of the rocking lever 43 is in fact illustrated as an eye, but can also be provided with an arcuate recess. In this form of closer the rollers 46 rest on a sliding piece 47 guided on the cylinder of the damping arrangement. To this sliding piece 47 there is articulated on each side a rocker 48, by means of a slot 49. These rockers 48 are of similar form and are each supported with their pointed ends on a stop 50 on the bottom of the closer housing 1. They are made arcuate, so that with their apices they rest on the spring plate 23 at least approximately in the horizontal longitudinal central plane of the damping arrangement.

In the closer as partly illustrated in FIGURES 12 to 14, the cam disc 6 is mounted for limited tilting movement on a journal 4a of the closer spindle 4. Beneath the cam disc 5, on which the closer spring (not shown) acts, the closer spindle 4 is provided with a fixed crank arm 4b. In this there is fitted a crank pin 4c, consisting for example of a heavy tension pin. The free end of this crank pin 4c extends into a slot 6a of the cam disc 6.

In the rocking lever 30, which is rotatable about the stationary hinge bolt 25, there is mounted the thrust roller 31 with its spindle 31a in a slot 30a, so that the thrust roller 31 may be displaced transversely of the longitudinal axis of the damping arrangement. Of this damping arrangement only the piston rod 17 with the roller 18 which rests on the rocking lever 30 is illustrated.

The illustrated mounting of the cam disc 6 on the journal 4a of the closer spindle 4 permits a pivoting movement of the cam disc 6 about the centre of the journal 4a in both directions of rotation within the limits determined by the slot 6a. Additionally to this pivoting movement, the thrust roller 31 can be displaced, as illustrated transversely of the longitudinal axis of the damping arrangement. The aim of the invention can however also already be achieved due to the fact that either the cam disc 6 is pivotable in the manner as illustrated and described, or the thrust roller 31 is transversely displaceable.

FIGURES 12 and 13 show the closer spindle 4 in the closed position after a closing movement in the clockwise direction. FIGURE 14 shows the closed position after a closing movement in the oposite direction. From this illustration it may be seen that the presser roller 31 of the damping arrangement lies outside the dead point position of the damping curve of the cam disc 6, when the closer spindle 4 is in the closure position.

If the direction of rotation of the closer spindle 4 changes on the next opening of the door, the cam disc 6 and/or the presser roller 31 snaps from one abutting position into the other.

In the closer as illustrated partly in FIGURES 15 and 16, the presser roller 31 is transversely movable due to the fact that the piston rod 17a is articulated on the piston 16, which is subject to the influence of the spring 19. 7a designates the cylinder of the damping arrangement. The lateral movement of the piston rod 17a is limited by two stop rollers 51, which are mounted on both sides of the piston rod 17a in projecting parts 44 of the housing 1. Here the piston rod 17a can be guided on the rollers 51 due to the fact that the rollers respectively engage in grooves 17b formed in rod 17a.

In this form of embodiment it is assumed that the cam disc 6 is non-rotatably mounted on the closer spindle 4. It is illustrated in the closed position after a closing movement in the clockwise direction. As a result of the pressure of the spring 19 the presser roller 31 rests on the damping curve of the cam disc 6 and the piston rod 17a rests on the stop roller 51. On opening of the door in the clockwise direction the presser roller 31 snaps with the piston rod 17a over into the position illustrated in dot-and-dash lines. In this construction of the pressure-transmitting means between the damping arrangement and the closer spindle 4, the presser roller 31 lies outside the dead point position of the damping curve of the cam disc 6, when in the closed position.

The closer as partly illustrated in FIGURES 17 and 18 corresponds in its assembly substantially to that according to FIGURES 5 and 6, but the piston rod 17 of the damping arrangement carries on its end facing the closer spindle 4 a hinge piece 52 with a hinge bolt 53. The bolt 53 passes through a slot 55 formed in one end of a connecting rod 54 coupled at its other end with the closer spindle 4. For this purpose the other end of the connecting end 54 extends into a recess 56 of the closer spindle 4 and is guided with its hinge bolt 57 in transversely extending, slightly curved slots 58 of the closer spindle 4. The upper end of the hinge bolt 53 of the universal joint is prolonged beyond the hinge piece 52 and here provided with a recess. With this the hinge bolt 53, when the closer is in the zero position, rests on the roller 46, which is mounted on the rocking lever 43 and supported, at the side opposite to the hinge bolt 53, on the spring plate 23.

In this closer the piston 16 of the damping arrangement is coupled through its piston rod 17 to the universal joint 52, 53 and the connecting rod 54 with the closer spindle 4, the hinge bolt 57 being guided in the slot 58. The closer spring 21 acts through the spring plate 23 and the roller 46 upon the hinge bolt 53. Due to this construction of the door closer the force from the closer spring 21 is transmitted through the closer spindle 4 to the damping arrangement a few angular degrees before the closure position is reached, and thus the spring force of the closer spring is damped during the last part of its expansion. This has the result that the door is not pressed suddenly into the closed position. Thus in the case of swinging doors the doors are prevented from oscillating, due to annihilation of the kinetic energy. This construction of the door closer also renders it possible to use the closer also for doors which open unilaterally.

We claim:

1. A door closer comprising, in combination, support means; a spindle adapted to be connected to a door for turning movement therewith and being mounted on said support means turnably about its axis; a pair of cam discs mounted on said spindle for turning movement therewith about said axis; damping means including a cylinder fastened at one end to said support means and extending from said one end toward said spindle, and a piston slidably arranged in said cylinder for movement toward and away from said spindle for producing during movement thereof in one direction a damping force; first transmission means between said piston and one of said cam discs for moving said piston during part of the turning movement of said spindle in said one direction so as to impart during said part of said turning movement of said spindle a braking moment on the latter, a helical closer spring arranged about said cylinder substantially coaxial therewith and connected at one end thereof to said cylinder; and second transmission means between the other end of said closer spring and the other of said cam discs for biasing said closer spring during turning movement of said spindle from a zero position in which a door connected to said spindle is closed in such a manner that said closer spring will impart to said spindle a closing moment tending to return said spindle to said zero position, said second transmission means including a rocking lever pivotally mounted at one end thereof to said support means, a force transmitting member pivotally connected at one end to the other end of said rocking lever and in operative engagement at the other end thereof with the other end of said closer spring, and a cam follower mounted on said rocking lever intermediate the ends thereof and engaging the other of said cam discs so as to transmit to the latter a force which is greater than that of the spring, said cam discs being differently shaped to vary during turning of said spindle from that zero position the closing moment imparted to said spindle in a first predetermined manner and to vary the braking moment in a second predetermined manner depending on the shape of said cam discs.

2. A door closer comprising, in combination, support means; a spindle adapted to be connected to a door for turning movement therewith and being mounted on said support means turnably about its axis; a pair of cam discs mounted on said spindle for turning movement therewith about said axis; damping means including a cylinder fastened at one end to said support means and extending from said one end toward said spindle, and a piston slidably arranged in said cylinder for movement toward and away from said spindle for producing during movement thereof in one direction a damping force; first transmission means between said piston and one of said cam discs for moving said piston during part of the turning movement of said spindle in said one direction so as to impart during said part of said turning movement of said spindle a braking moment on the latter, said first transmission means including a piston rod connected at one end to said piston for movement therewith, a rocking lever pivotally mounted at one end thereof on said support means, a cam roller carried by said rocking lever spaced from said one end thereof and engaging said one cam disc, and a second roller carried on the free end of the piston rod and engaging said rocking lever on the side thereof distant from said one cam disc; a helical closer spring arranged about said cylinder substantially coaxial therewith and connected at one end thereof to said cylinder; and second transmission means between the other end of said closer spring and the other of said cam discs for biasing said closer spring during turning movement of said spindle from a zero position in which a door connected to said spindle is closed in such a manner that said closer spring will impart to said spindle a closing moment tending to return said spindle to said zero position, said second transmission means including a second rocking lever extending transverse to the axis of said closer spring and pivotally mounted at one end to said support means, a force transmitting member pivotally connected at one end to the other end of said second rocking lever and in operative engagement at the other end thereof with the other end of said closure spring, said one and said other end of said rocking lever being respectively located at opposite sides of the axis of said spring spaced therefrom, and a cam follower mounted on said second rocking lever intermediate the ends thereof and engaging the other of said cam discs so as to transmit to the latter a force which is greater than that of the spring, said cam discs being differently shaped to vary during turning of said spindle from that zero position the closing moment imparted to said spindle in a first predetermined manner and to vary the braking moment in a second predetermined manner depending on the shape of said cam discs.

3. A door closer comprising, in combination, support means; a spindle adapted to be connected to a door for turning movement therewith and being mounted on said support means turnably about its axis; a pair of cam discs mounted on said spindle for turning movement therewith about said axis; damping means including a cylinder fastened at one end to said support means and extending from said one end toward said spindle, and a piston slidably arranged in said cylinder for movement toward and away from said spindle for producing during movement thereof in one direction a damping force; first transmission means between said piston and one of said cam discs for moving said piston during part of the turning movement of said spindle in said one direction so as to impart during said part of said turning movement of said spindle a braking moment on the latter, said first transmission means including a piston rod connected at one end to said piston for movement therewith, a rocking lever pivotally mounted at one end thereof on said support means, a cam roller carried by said rocking lever spaced from said one end thereof and engaging said one cam disc, and a second roller carried on the free end of the piston rod and engaging said rocking lever on the side thereof distant from said one cam disc; a helical closer spring arranged about said cylinder substantially coaxial therewith and connected at one end thereof to said cylinder; and second transmission means between the other end of said closer spring and the other of said cam discs for biasing said closer spring during turning movement of said spindle from a zero position in which a door connected to said spindle is closed in such a manner that said closer spring will impart to said spindle a closing moment tending to return said spindle to said zero position, said second transmission means including a second rocking lever extending transverse to the axis of said spring, said second rocking lever being pivoted at one end thereof to said support means at a point spaced from and located to one side of the axis of said spring, a guide rod in operative engagement at one end thereof with the other end of said helical closer spring and pivotally connected at the other end thereof to the other a guide rod in operative engagement at one end thereof with the other end of said helical closer spring and pivotally connected at the other end thereof to the other end of said second rocking lever at a point spaced from and located at the other side of the axis of said spring, and a cam roller turnably mounted on said second rocking lever between the ends thereof and engaging said other of said cam discs so as to transmit to the latter a force greater than that developed at any instant by said spring, said cam discs being differently shaped to vary during turning of said spindle from that zero position the closing moment imparted to said spindle in a first predetermined manner and to vary the braking moment in a second predetermined manner depending on the shape of said cam discs.

4. A door closer as set forth in claim 3, in which said rocking levers are mounted on said support means pivotally about a common axis.

5. A door closer as set forth in claim 3, in which said one cam disc has a cam face engaged by said cam roller of said first transmission means, said cam face being spaced farthest from the axis of said spindle at a first portion thereof engaged by said cam roller of said first transmission means when said spindle is in said zero position and said cam face gradually approaching the axis of said spindle at opposite sides of said first portion along cam face portions extending respectively through angles of substantially 90° about said axis and said second cam face portions being each followed by third cam face portions curving away from said axis and each extending through an angle of substantially 30° about said axis, while the remainder of said cam face extends along a circle having its center at said axis and a radius substantially equal to the maximum distance of said second cam face portions from said axis, and said second cam disc having a cam face extending substantially along a circle having a center point located to one side of the axis of said spindle and being formed with a depression located at the other side of said axis diametrically opposite said center point and said cam roller of said second transmission means being located in said depression when said spindle is in said zero position.

6. A door closer as set forth in claim 3, in which three cam disks are mounted on said spindle one above the other, the uppermost and the lowermost of said cam discs having identical cam faces and being equally spaced from the third cam disc, and in which said second transmission means includes a pair of rocking levers arranged one above the other and having each a guide rod connected thereto respectively equally spaced from the axis of said helical closer spring and a cam roller mounted on each of said rocking levers of said second transmission means and respectively engaging said uppermost and lowermost of said cam discs.

7. A door closer as set forth in claim 3, in which said second transmission means includes a spring plate mounted on said cylinder for sliding movement therealong and abutting with one face thereof against said other end of said spring, an additional rocking lever pivoted at one end thereof to said support means and pivotally connected at the other end thereof to said one end of said guide rod, and an additional roller turnable carried on said other end of said additional rocking lever and abutting against the other face of said spring plate.

8. A door closer as set forth in claim 7, and including limiting means sandwiched between said spring plate and said additional roller for limiting the movement of said spring plate toward said spindle.

9. A door closer as set forth in claim 8, in which said limiting means include a member mounted on said cylinder for movement toward and away from said spindle and engaged on a side thereof facing said spindle by said additional roller, rocker means connected at one end thereof to said member and engaging with a portion thereof said spring plate, and stop means fixed to said support means and engaged by the other end of said rocker means.

10. A door closer as set forth in claim 1, in which said one cam disc is mounted on said spindle for limiting tilting movement thereto about said axis, and including means fixed to said spindle for limiting tilting movement of said one cam disc.

11. A door closer as set forth as in claim 10, in which said means for limiting said tilting movement of said one cam disc include elongated slot means and pins means extending parallel to the axis of said spindle into said slot means, one of said means being fixed to said spindle and the other to said one cam disc.

12. A door closer as set forth in claim 2, in which said cam roller is mounted on said rocking lever movable in direction transverse to the axis of said cylinder.

13. A door closer as set forth in claim 1, in which said first transmission means include a piston rod pivotally connected at one end thereof to said piston and a cam roller mounted on the free end of said piston rod and engaging said one cam disc, said door closer further including a pair of stop means fixed to said support means and arranged on opposite sides of said piston rod for limiting pivotal movement thereof.

14. A door closer as set forth in claim 13, in which said piston rod is formed along opposite sides thereof with a pair of longitudinal grooves and in which each of said stop means includes a roller adapted to engage in said grooves.

15. A door closer comprising, in combination, support means; a spindle adapted to be connected to a door for turning movement therewith and being mounted on said support means turnably about its axis, said support means including a housing having an outline in the form of a narrow, elongated trapezium, said spindle being located adjacent one end of said housing and said trapezium tapers towards the other end of said housing, said support means further including an installation box in which said housing is mounted adjustable for tilting movement about the axis of said spindle, and means for securing said housing in said box in any adjusted position; a pair of cam discs mounted on said spindle for turning movement therewith about said axis; damping means fastened to said support means and including a movable member producing during movement thereof a braking force; first transmission means between said movable member of said damping means and one of said cam discs for moving said movable member during turning of said spindle and for imparting a braking moment on said spindle during movement of said movable member; a closer spring connected at one end thereof to said support means; and second transmission means between the other end of said closer spring and the other of said cam discs for biasing said closer spring during turning movement of said spindle from a zero position in which a door connected to said spindle is closed in such a manner that said closer spring will impart to said spindle a closing moment tending to return said spindle to said zero position, said second transmission means including a rocking lever pivotally mounted at one end thereof to said support means, a force transmitting member pivotally connected at one end to the other end of said rocking lever and in operative engagement at the other end thereof with the other end of said closer spring, and a cam follower mounted on said rocking lever intermediate the ends thereof and engaging the other of said cam discs so as to transmit to the latter a force which is greater than that of the spring, said cam discs being differently shaped to vary during turning of said spindle from that zero position the closing moment imparted to said spindle in a first predetermined manner and to vary the braking moment in a second predetermined manner depending on the shape of said cam discs.

References Cited by the Examiner

UNITED STATES PATENTS

| 1,243,947 | 10/17 | Keene | 16—55 |
| 2,752,627 | 7/56 | Carlson | 16—55 |
| 2,890,474 | 6/59 | Ferguson | 16—55 |

FOREIGN PATENTS

| 743,548 | 1/56 | Great Britain. |
| 291,453 | 9/53 | Switzerland. |

JOSEPH D. SEERS, *Primary Examiner.*

DONLEY J. STOCKING, BERNARD A. GELAK,
*Examiners.*